No. 879,270. PATENTED FEB. 18, 1908.
J. R. JUDGE.
FILTER.
APPLICATION FILED NOV. 5, 1906.
2 SHEETS—SHEET 2.
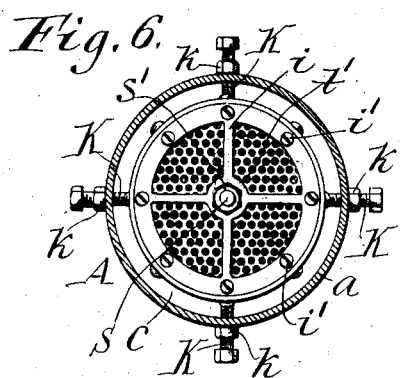
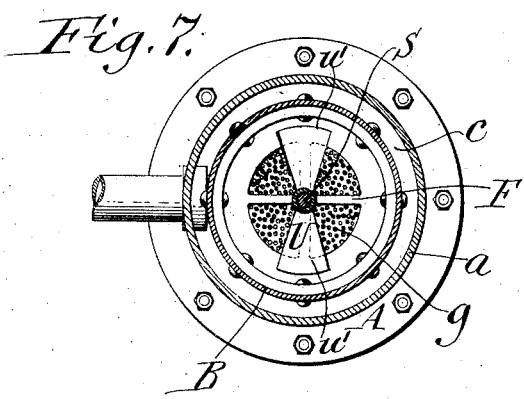
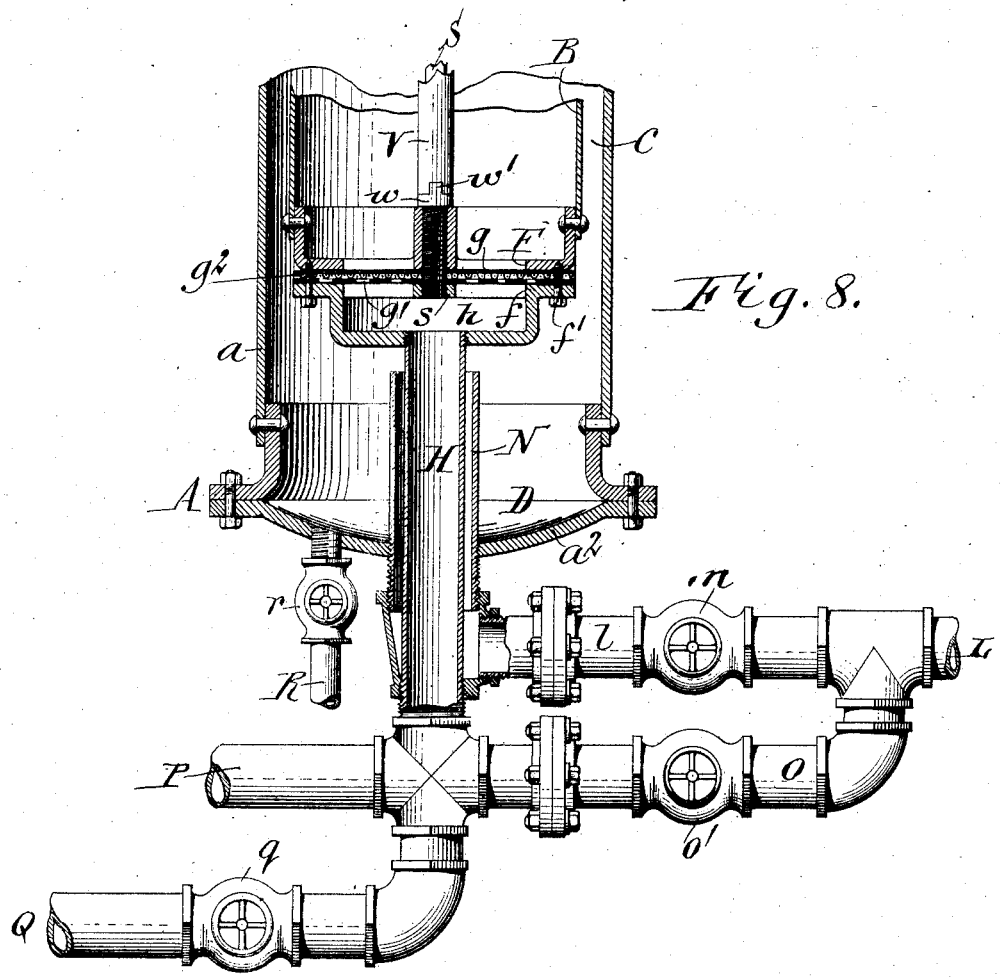
Witnesses
Richard Sommer
Louis W. Gratz
Inventor
John R. Judge
by Geyer & Popp
Attorneys

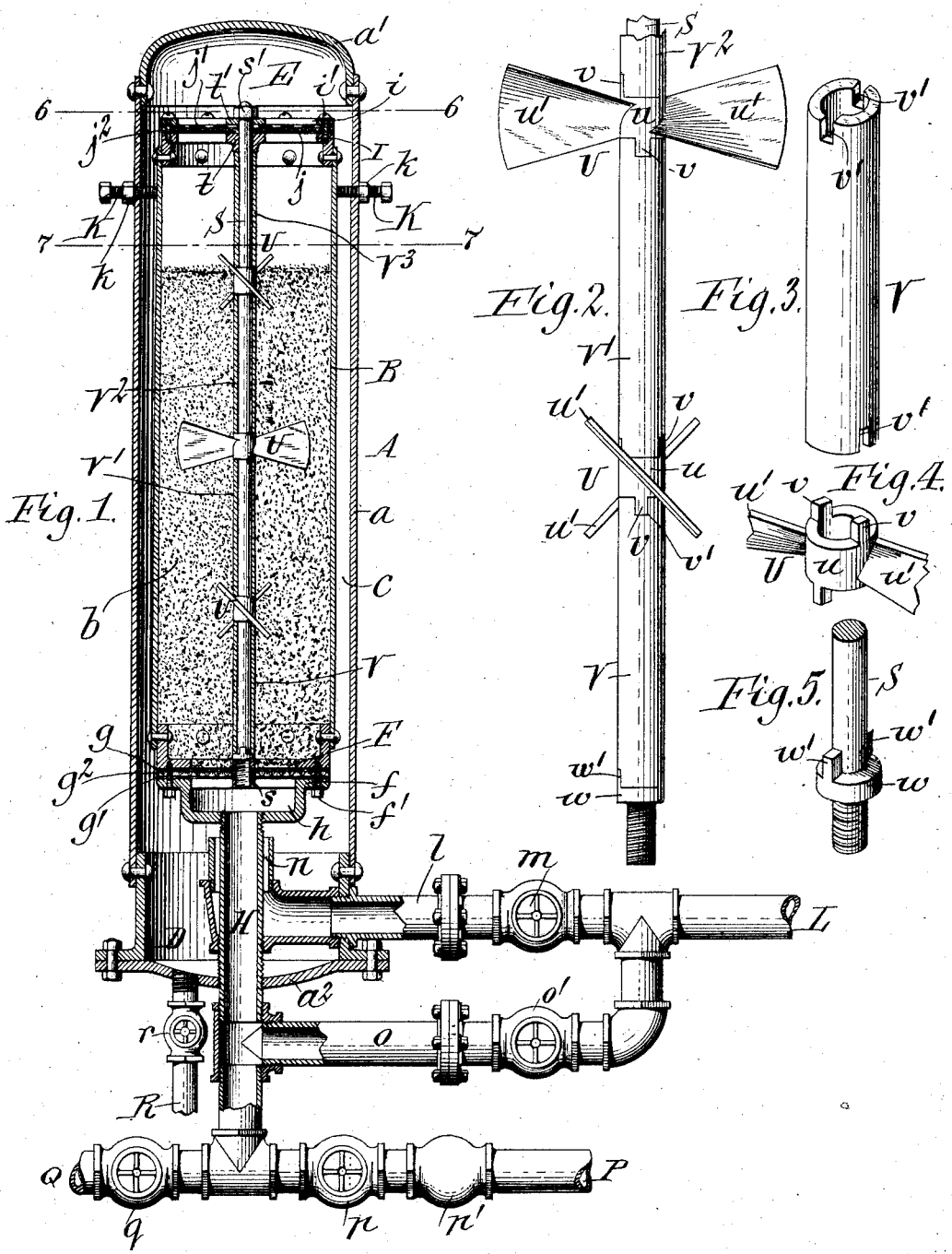

UNITED STATES PATENT OFFICE.

JOHN R. JUDGE, OF BUFFALO, NEW YORK.

FILTER.

No. 879,270.  Specification of Letters Patent.  Patented Feb. 18, 1908.

Application filed November 5, 1906. Serial No. 341,974.

*To all whom it may concern:*

Be it known that I, JOHN R. JUDGE, a citizen of the United States, residing at Buffalo, in the county of Erie and State of New York, have invented a new and useful Improvement in Filters, of which the following is a specification.

This invention relates to a filter in which water is filtered by pressing or forcing the same through a body of granular filtering material.

The object of this invention is to produce a filter of this character which is of simple and compact construction, efficient in operation and capable of being readily and thoroughly cleaned when necessary.

In the accompanying drawings consisting of 2 sheets: Figure 1 is a vertical section of one form of my improved filter. Fig. 2 is a fragmentary side elevation, on an enlarged scale, of the agitating device whereby the granular filtering material is stirred up while cleaning or washing the same. Fig. 3 is a perspective view of one of the spacing sleeves whereby the agitating members are held in place. Fig. 4 is a fragmentary perspective view of one of the agitators. Fig. 5 is a similar view of the lower part of the rod which supports the agitator and the sleeves which separate them. Figs. 6 and 7 are horizontal sections in the correspondingly numbered lines in Fig. 1. Fig. 8 is a fragmentary vertical section of the filter showing a modified construction of the water inlet and outlet.

Similar letters of reference indicate corresponding parts throughout the several views.

A represents the outer imperforate shell or casing of the filter consisting of an upright cylinder or body $a$ which is closed at its upper and lower ends by a top $a^1$ and a bottom $a^2$. Within the outer shell is arranged an imperforate inner cylindrical shell, chamber or receptacle B which is adapted to hold a bed or body of granular filtering material $b$, such as emery or sand. This receptacle, preferably of cylindrical form, is arranged axially within the outer shell and separated from the latter by an annular space $c$ throughout the length thereof.

The lower end of the filtering chamber terminates some distance above the bottom of the outer shell so as to form a settling space or chamber D at this end of the outer shell. The upper end of the filtering chamber terminates short of the upper end of the outer shell so as to form a passage or space E between the same which connects the annular space between the shells and the upper end of the filtering chamber.

At its lower end the filtering chamber is provided with a foraminous support or diaphragm for the body of the filtering material and the same is also connected with the bottom of the outer shell in such manner that this support serves as a means for sustaining the filtering chamber and also as a conduit for the discharge of the filtered water or admission of cleaning water. The construction for this purpose shown in Fig. 1 is as follows:—F represents an inner grid or frame secured to the lower end of the inner shell and $f$ an outer grid or frame secured to the grid F by means of bolts $f^1$ or otherwise. Between these two grids a screen is secured consisting of an upper sheet $g$ of finely perforated metal, a lower sheet $g^1$ of coarsely perforated metal and an intermediate sheet $g^2$ of woven wire the mesh of which has openings of a size intermediate those of the perforated sheets on opposite sides of the same. On its under or outer side the lower grid $f$ is provided with a water head or chamber $h$ and into the lower end of this chamber is secured the upper end of an upright water conduit or pipe H which latter passes downwardly with its lower part through the bottom of the filter casing and is secured thereto by a screw joint, as shown, or otherwise.

At the upper end of the filtering chamber is arranged a foraminous diaphragm for the purpose of confining the granular body in the filtering chamber and preventing the same from escaping therefrom when an upward current of water is produced in this chamber for washing the granular material. As shown, this upper diaphragm consists of a lower or inner grid or frame I secured to the upper end of the filtering chamber, an upper or outer grid $i$ secured to the margin of the inner grid I by screws $i^1$ as shown, or otherwise, and a screen clamped between the grids I, $i$ and consisting of an inner sheet $j$ of finely perforated metal, an outer sheet $j^1$ of coarsely perforated metal and an intermediate sheet $j^2$ of woven wire having openings of the size intermediate those of the perforated sheets on opposite sides of the same.

The upper end of the filtering chamber is held in a central position and prevented from becoming displaced laterally by means of a plurality of retaining or centering screws K which are arranged in openings in the upper part of the outer shell and bear against the outer side of the inner shell, jam nuts $k$ being applied to these retaining screws for holding them in place.

L represents the main water supply pipe having a branch $l$ which supplies the water during the normal or filtering operation of the filter and containing a valve $m$ whereby the passage of the water through the same may be controlled. This branch pipe extends horizontally and laterally through the side wall of the outer shell at the lower end thereof into the settling space thereof and is provided between the bottom of the outer shell and the water chamber at the lower end of the inner shell with a nozzle $n$. This nozzle surrounds the water conduit H and forms an annular delivery space around the same which opens upwardly and terminates some distance above the bottom of the outer shell.

O represents a by-pass or pipe connecting the main water supply pipe in front of the valve $m$ with the conduit H below the outer shell and containing a valve $o^1$ for controlling the passage of water through the by-pass. Below the by-pass the conduit or pipe H connects with two branch pipes P, Q, one leading to the boiler or other place and containing a hand valve $p$ and a check valve $p^1$, and the other leading to the waste or sewer and containing a hand valve $q$. At the lower end or bottom of the outer shell, the same is provided with a blow-off or drain pipe R containing a valve $r$.

During the normal operation of the filter, the valves $r$, $q$ and $o^1$ are closed and the valves $m$, $p$ are open, and the body of filtering material rests compactly on the lower screen, leaving a space in the upper end of the filtering chamber which is unoccupied by filtering material. In this condition of the filter, the water entering through the supply pipe passes through the branch pipe $l$ into the nozzle $n$ and discharges from the upper end of the latter into the settling space or chamber of the outer shell. Upon issuing from this nozzle the water passes laterally toward the side of the outer shell and as the water at this time is distributed over a considerably greater area than that of the nozzle and supply pipe, the same travels slower, thereby permitting any heavy impurities contained in the water to separate therefrom and precipitate to the bottom of the outer shell. Upon reaching the side of the outer shell, the water passes upwardly through the annular space between the same and the inner shell to the top thereof. Thence the water passes inwardly and downwardly through the upper screen and into the top of the filtering chamber, thence downwardly through the body of filtering material, thence through the lower screen and into the water chamber or head $h$ and thence downwardly through the outlet or discharge pipe H and into the delivery pipe P which conducts the same to the boiler. In passing through the filtering bed, the remaining light impurities contained in the water are separated therefrom. Any oil present in the water is separated therefrom and collects at the top of the outer shell.

When it is desired to clean the filter, the valves $m$, $p$ are closed and the valves $o^1$, $r$ of the by-pass and blow-off are opened. The water now passes from the main pipe through the by-pass, thence upwardly through the conduit H, water chamber $h$, the lower screen, the filtering material, the upper screen and into the upper end of the outer shell, thence laterally and downwardly through the annular space between the shells and into the settling chamber at the lower end thereof, and thence outwardly through the blow-off pipe to the sewer or other place. During this upward passage of the water, through the body of granular filtering material, the same is lifted and loosened and the impurities mixed therewith or clinging thereto are detached and carried away with the water and the sediment which has accumulated on the bottom of the outer shell is also washed out through the blow-off. For a short time after the impurities have been thus washed out of the filtering material the by-pass valve $o^1$ is closed, the valve $m$ in the branch supply $l$ is opened, the valve $q$ of the waste pipe is opened and the valves $p$, $p^1$ are kept closed so that any free impurities remaining in the filter may be carried away to the sewer before resuming feeding the filtered water to the regular place of consumption. In case the water contains lime or similar impurities the same may be heated to the required temperature before entering the filter whereby the lime contained in the water is precipitated immediately upon issuing from the nozzle into the settling chamber. In order to enable the water during this reversal of its movement to reach all parts of the granular filtering bed and thoroughly remove or wash out all the impurities therefrom, an agitating device is provided which operates to stir up the granular body as the same is being lifted. This agitating device is preferably constructed as follows:—

S represents an upright supporting rod arranged centrally within the filtering chamber and screwed at its lower end into a socket or hub $s$ at the center of the lower grid or frame $f$ while its upper end passes through hubs or sockets $t$, $t^1$ formed centrally on the grids I, $i$ of the upper diaphragm, and is held in place by a nut $s^1$ arranged on the rod and bearing against the upper socket $t^1$, as shown.

U represents a plurality of agitators each of which consists of a tubular hub $u$ arranged on the supporting rod S and provided with one or more inclined blades $u^1$ which project outwardly from the hub. As shown in the drawings, three of such agitators are arranged at different elevations on the rod and each agitator is provided on diametrically opposite sides of its hub with two blades. The several agitators are so arranged that the blades of each are vertically out of line with the blades of the adjacent agitator, whereby the agitating or deflecting surfaces furnished by these blades are distributed over the area of the filtering chamber and all parts of the filtering bed meet with an obstruction upon being lifted by the water, thereby insuring thorough disintegration of the same and enabling the water to thoroughly wash out or separate the impurities therefrom.

V, V¹, V², V³ represent spacing sleeves whereby the agitators are held the required distance apart on the supporting rod. One of these spacing sleeves is arranged between the lower end of the hub of the lowermost agitator and a collar $w$ at the lower end of the supporting rod, another is arranged between the upper end of the hub of the uppermost agitator and the socket of the inner upper grid, and two others are arranged between opposite ends of the hub of the central agitator and the opposing ends of the hubs of the upper and lower agitators.

In order to prevent the agitators from turning and thus form immovable or stationary obstructions with which the filter bed engages upon being lifted, the lowermost sleeve V is interlocked with the supporting rod and each of the agitators is in like manner interlocked with the opposing ends of the spacing sleeves. The preferred means for thus interlocking these parts consists in forming lugs $v$ on opposite ends of the hub of each agitator and engaging the same with corresponding notches or recesses $v^1$ in the opposing ends of the spacing sleeves and providing the collar $w$ at the lower end of the supporting rod with lugs $w^1$ which engage with notches or recesses in the lower end of the lowermost spacing sleeve, as shown in Figs. 1—5.

The uppermost sleeve V³ extends to the underside of the socket on the inner upper grid, whereby the several sleeves and agitators are held against axial movement in the filtering chamber and prevented from becoming displaced by the lifting action of the water while washing or cleaning the filter. This means of connecting the several spacing sleeves and agitators and preventing them from turning on the supporting rod is not only very simple but it also permits of readily assembling the parts in erecting the filter or dismembering the same for cleaning or repairs without the use of any set screws or similar loose parts requiring tools for their manipulation.

The construction of the filter shown in Fig. 1, is very compact owing to the passage of the branch water supply pipe laterally through the side of the outer shell. Where room is available, the water connections may be made wholly below the outer chamber, as shown in Fig. 8, in which the branch water supply pipe connects with a discharge nozzle N which surrounds the water conduit H partly on the outside and partly on the inside of the outer shell and extends upwardly through the bottom of this shell to which it is secured by a screw joint. In this last-mentioned construction, the weight of the filtering chamber and its contents is supported from the bottom of the outer shell through the medium of the discharge nozzle N which operates as a connection between the delivery conduit H and said bottom.

I claim as my invention:

1. A filter comprising an outer inclosing shell, an imperforate inner shell arranged within the outer shell and separated therefrom by an annular space, said inner shell being adapted to contain a body of filtering material, screens arranged at the upper and lower ends of said inner shell, a water delivery chamber arranged within the lower part of the outer shell and connected with the inner shell below its lower screen, an upright water delivery pipe connected at its upper end with said chamber and at its lower end with the bottom of the outer shell, and a water supply pipe arranged concentrically around the delivery pipe and communicating with the space between the shells, substantially as set forth.

2. A filter comprising an outer inclosing shell, an imperforate inner shell arranged within the outer shell and separated therefrom by an annular space, said inner shell being adapted to contain a body of filtering material, screens arranged at the upper and lower ends of said inner shell, a water delivery chamber arranged within the lower part of the outer shell and connected with the inner shell below its lower screen, an upright water delivery pipe connected at its upper end with said chamber and at its lower end with the bottom of the outer shell, and a water supply pipe, arranged concentrically around the delivery pipe and opening upwardly into the space between said shells, substantially as set forth.

3. A filter comprising an outer inclosing shell, an imperforate inner shell arranged within the outer shell and separated therefrom by an annular space, said inner shell being adapted to contain a body of filtering material, screens arranged at the upper and lower ends of said inner shell, a water delivery chamber arranged within the lower part of the outer shell and connected with the inner shell below its screen, an upright water delivery pipe connected at its upper end with said chamber and at its lower end with the bottom of the outer shell, and a water supply pipe extending transversely through the side of the outer shell at the lower end thereof and having an upwardly extending part which is arranged concentrically around the delivery pipe and opens upwardly into the space between said shells at the bottom thereof, substantially as set forth.

4. A filter comprising an outer imperforate inclosing shell, an inner imperforate shell arranged within the outer shell and separated at its underside from the bottom of the outer shell by a sediment precipitating space while its side is separated from the side of the inclosing chamber by an annular water passage, screens arranged at the upper and lower ends of the inner shell, a body of granular filter material arranged only within the lower part of the inner shell while the upper part thereof is unoccupied by filtering material, a water supply pipe connected with the outer shell, a delivery chamber connected with the inner shell below its lower screen, a water delivery pipe connected with said chamber, and an agitator arranged within the inner shell and comprising an upright non-rotatable rod connected at its upper and lower ends with said upper and lower screens, and blades mounted at different heights on said rod, substantially as set forth.

5. A filter comprising an upright receptacle for holding a body of granular filtering material a screen arranged at the lower end of said receptacle, an upright rod secured at its lower end to said screen, and a plurality of fixed agitating blades mounted at different elevations on said rod, spacing sleeves arranged on said rod and alternating with said blades, and means for interlocking said rod spacing sleeves and blades, substantially as set forth.

6. A filter comprising a receptacle for a body of granular filtering material, screens secured to the upper and lower ends of said receptacle, a stationary upright extending from the lower screen to the upper screen, agitators arranged at different elevations and each consisting of a hub mounted on said rod and inclined blades radiating from the hub, spacing sleeves mounted on said rod and alternating with said agitators, and interlocking lugs and recesses formed on the opposing parts of the agitators and the spacing sleeves and between the lowermost spacing sleeve and said rod, substantially as set forth.

Witness my hand this 30th day of October, 1906.

JOHN R. JUDGE.

Witnesses:
   THEO. L. POPP,
   E. M. GRAHAM.